(12) United States Patent
Eijsbouts-Spickova et al.

(10) Patent No.: US 7,964,528 B2
(45) Date of Patent: Jun. 21, 2011

(54) PROCESS FOR THE PREPARATION OF A SHAPED BULK CATALYST

(75) Inventors: Sona Eijsbouts-Spickova, Nieuwkuijk (NL); Robertus Gerardus Leliveld, Utrecht (NL); Johannes Cornelis Sitters, Amersfoort (NL); Marinus Bruce Cerfontain, Amsterdam (NL); Bob Gerardus Oogjen, Almere (NL)

(73) Assignee: Albemarle Netherlands, B.V., Amersfoort (NL)

( * ) Notice: Subject to any disclaimer, the term of this patent is extended or adjusted under 35 U.S.C. 154(b) by 491 days.

(21) Appl. No.: 12/091,362

(22) PCT Filed: Oct. 25, 2006

(86) PCT No.: PCT/EP2006/010293
§ 371 (c)(1),
(2), (4) Date: Aug. 26, 2008

(87) PCT Pub. No.: WO2007/048594
PCT Pub. Date: May 3, 2007

(65) Prior Publication Data
US 2009/0014356 A1    Jan. 15, 2009

(30) Foreign Application Priority Data
Oct. 26, 2005    (EP) .................................... 05110051

(51) Int. Cl.
*C10G 45/00* (2006.01)
(52) U.S. Cl. ...... 502/313; 502/305; 502/315; 208/208 R; 208/213; 208/216 R
(58) Field of Classification Search .............. 208/208 R, 208/213, 216 R, 243–244; 502/305, 313, 502/315
See application file for complete search history.

(56) References Cited

U.S. PATENT DOCUMENTS

| 5,122,258 A | 6/1992 | Eadie et al. |
| 2003/0102254 A1 | 6/2003 | Eijsbouts et al. |
| 2005/0113250 A1 | 5/2005 | Schleicher et al. |

FOREIGN PATENT DOCUMENTS

| WO | WO 00/041810 A1 | 7/2000 |
| WO | WO 00/041811 A1 | 7/2000 |
| WO | WO 2005/033930 A2 | 4/2005 |

OTHER PUBLICATIONS

Teh C. Ho, et al; "Deep HDS of Diesel Fuel:Chemistry and Catalysis"; Catalysis Today; 2004; p. 3-18; vol. 98; Elsevier B.V.; Amsterdam, Netherlands.
XP-002135661; Rudolf Zidek, et al; Catalyst for the Manufacture of Formaldehyde by Oxidation of Methanol; Chemical Abstracts + Indexes; 1976; p. 442; vol. 84; American Chemical Society; Columbus, Ohio, US.

*Primary Examiner* — Robert J Hill, Jr.
*Assistant Examiner* — Brian McCaig
(74) *Attorney, Agent, or Firm* — Jeremy J. Kliebert

(57) ABSTRACT

The invention relates to a process for the preparation of a shaped bulk catalyst comprising metal oxide particles comprising one or more Group VIII metals and two or more Group VIB metals which process comprises the steps of providing first metal oxidic particles comprising one or more first Group VIII metals and one or more first Group VIB metals, providing separately prepared second metal oxidic particles comprising one or more second Group VIII metals and one or more second Group VIB metals, wherein the composition of Group VIB and Group VIII metals in the first and second metal oxidic particles are different, combining the first and second metal oxidic particles before and/or during shaping and shaping the combined first and second metal oxide particles to form a shaped bulk catalyst. The invention further relates to the shaped bulk catalyst obtainable with the process In sulphided or unsulphided form and the use thereof in hydroprocessing.

19 Claims, No Drawings

PROCESS FOR THE PREPARATION OF A SHAPED BULK CATALYST

The invention relates to a process for the preparation of a shaped bulk catalyst comprising metal oxidic particles comprising one or more Group VIII metals and two or more Group VIB metals. The invention further relates to the shaped bulk catalyst composition obtainable with the process in sulphided or unsulphided form and the use thereof in hydroprocessing.

With a bulk catalyst is meant a catalyst comprising at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. The bulk catalyst usually is in the form of shaped particles, for example produced by extrusion of a composition comprising the metal oxidic particles and 0-40 wt % of additional material, in particular a binder material. A bulk catalyst generally has a very high activity in hydroprocessing.

The term "hydroprocessing or hydrotreatment" in this context encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. Hereafter, when referring to a high activity of the bulk catalyst according to the invention, in particular the hydrodesulphurization activity is implied unless otherwise indicated.

WO 00/41810 describes a bulk catalyst comprising bulk catalyst particles comprising at least one group VIII metal and at least two group VIB metals (hereafter referred to as trimetallic bulk catalysts), in particular nickel/molybdenum/tungsten based catalysts. The comparative examples also describe bulk catalyst comprising substantially only one group VIB metal and one Group VIII metals (here after referred to as bimetallic bulk catalysts). The trimetallic bulk catalysts appear to have a significantly higher catalytic activity than the bimetallic bulk catalyst. The trimetallic bulk catalyst particles are prepared in a process in which metal compounds comprising one or more Group VIII metals and two or more Group VIB metals are combined in the presence of a protic liquid and wherein one or more metal compounds remains at least partly in the solid state during the entire process. The process wherein at least one of the metal compounds remains at least partly in the solid state and at least one compound is in solute state is referred to as the solid-solute process. The process wherein all group VIB and group VIII metal compounds remain at least partly in the solid state is referred to as the solid-solid process.

WO 00/41811 describes a trimetallic bulk hydroprocessing catalysts and a process for the manufacture thereof comprising the steps of combining and reacting at least one group VIII metal compound in solution with at least two group VIB metal compounds in solution in a reaction mixture to obtain a precipitate. This process is referred to as the solute-solute process. The comparative examples also describe bimetallic bulk catalyst comprising only one group VIB metal and only one Group VIII metal. The trimetallic bulk catalysts have a significantly higher catalytic activity than the bimetallic bulk catalysts.

Different hydroprocessing conditions, different hydroprocessing feedstock or different equipment limitations may require a different composition of the trimetallic bulk catalyst composition. Irrespective of the type of production process used, from a chemical point of view a trimetallic bulk catalyst composition comprising two or more Group VIB metals is significantly more difficult to produce than a bimetallic catalyst. Changes in the composition of the desired bulk catalyst cannot always be directly translated into changes in composition of the starting metal compounds and/or changes in the process conditions. Apart from that, in the prior art process when switching from one to another bulk catalyst composition, there is considerable down time between the production runs leading to a reduced production capacity. Furthermore, when switching from one to another bulk catalyst composition, more waste is produced compared to a single production run, leading to more environmental burden and loss of precious metals.

The object of the invention is to provide a process for the manufacture of a trimetallic bulk catalyst composition that does not have the disadvantages described above.

According to the invention there is provided a process for the preparation of a shaped bulk catalyst, which process comprises the steps of i) providing first metal oxidic particles comprising one or more first Group VIII metals and one or more first Group VIB metals ii) providing separately prepared second metal oxidic particles comprising one or more second Group VIII metals and one or more second Group VIB metals, wherein the composition of Group VIB and Group VIII metals in the first and second metal oxidic particles are different, iii) combining the first and second metal oxidic particles to form a bulk catalyst composition before and/or during shaping and iv) shaping the combined first and second metal oxide particles to form the shaped bulk catalyst.

The process according to the invention was found to be less complex from a chemical point of view and has optimal flexibility in changing to different bulk catalyst compositions. The first and second metal oxidic particles are produced in individually optimised standard production runs allowing an optimised high-quality of the obtained metal oxidic bulk catalyst particles and optimised high production capacity without the necessity of creating downtime and extra waste when changing to a different composition of the bulk catalyst composition. It was surprisingly found that the activity of the shaped bulk catalyst according to the invention is comparable to or even higher than the activity of the prior art trimetallic catalysts with the same overall composition. This is particularly surprising for the preferred mode of the process according to the invention, in which one or both of the first and second metal oxidic particles are bimetallic oxidic particles comprising only one Group VIB metal, because according to the prior art the bimetallic bulk catalysts have a significantly lower catalytic activity.

According to a first embodiment of the process according to the invention, the first and second metal oxidic particles are combined before and/or during shaping to form shaped mixed bulk catalyst particles. Combining the first and second metal oxidic particles also includes combining of compositions comprising the first or second metal oxidic particles. For example, the first and/or second metal oxidic particles can be composited with binder material processing aid before being combined and shaped. Details of the shaping process are described below. In this embodiment the first and second metal oxidic particles are preferably homogeneously mixed such that all the shaped particles have basically the same over-all trimetallic composition.

The first and second oxidic bulk particles are combined in relative amounts based on the envisaged end-use application of the catalyst, preferably the molybdenum to tungsten mole ratio in the bulk catalyst composition is between 1:9 and 9:1.

With a "different composition" it is primarily meant that the Group VIB and/or Group VIII metals in the first metal oxidic particles are different from the Group VIB and/or Group VIII metals in the second metal oxidic particles. It is preferred that in the process the Group VIB metals in the first metal oxidic particles are different from the Group VIB metals in the second metal oxidic particles. It is further preferred that the Group VIII metals in the first oxidic metal particles are the same as in the second metal oxidic particles. In the process of this invention preferably the first metal oxidic particles comprise Molybdenum as the main Group VIB metal and the second metal oxidic particles comprise tungsten as the main Group VIB metal. More preferably, the Group VIII metal in both the first and second metal oxidic particles is the same, preferably nickel or cobalt, and the Group VIB metal in the first oxidic bulk catalyst is substantially only Molybdenum and in the second oxidic bulk catalyst is substantially only tungsten. "is substantially only" implies that the catalyst has preferably no other, but may have an insubstantial amount of another Group VIB or Group VIII metal, preferably less than 5, more preferably less than 3 and most preferably less than 1 mole % (relative to the total of the group VIB or group VIII metals). Most preferably the first and second metal oxidic particles are substantially bimetallic NiMo and NiW oxidic particles respectively. In an alternative embodiment, the first metal oxidic particles comprise 2 or more group VIB metals and one or more Group VIII metals and wherein the second oxidic particles comprise substantially only one Group VIB metal and one or more Group VIII metals. In this embodiment the first metal oxidic particles are trimetallic NiMoW particles and the second metal oxidic particles are substantially bimetallic NiW and/or NiMo metal oxidic particles.

The shaped bulk catalyst preferably comprises only one Group VIII metal, preferably non-noble metals cobalt, nickel or iron, but optionally may comprise an additional Group VIII metal. Although it is less preferred, the catalyst may contain minor amounts of other metals. The bulk catalyst may optionally further comprise preferably less than 10%, more preferably les than 9%, even more preferably less than 7%, and most preferably below 5% (mole % relative to the total of the Group VIB metals) of an additional other metal, in particular a Group V metal, preferably Niobium.

In the most important embodiment of the process according to the invention the first and second oxidic bulk particles are both freshly prepared. However, it is envisaged that it is possible to use the process of the invention for changing the catalytic properties of a previously prepared finished bulk catalyst to change the properties in view of different requirements. For example, the process can also be used for preparing a bulk catalyst composition wherein the first oxidic bulk particles are provided at least in part in the form of spent, used, reject or regenerated spent oxidic particles or bulk catalyst and the second metal oxidic particles is freshly prepared. It may be necessary to bring the spent, reject or regenerated spent oxidic particles or bulk catalyst in a suitable form, for example by grinding, such that it can be conveniently combined and shaped together with the freshly prepared metal oxidic particles. Spent, used or regenerated spent bulk catalysts can be upgraded to meet the requirements for use in specific hydrotreatment conditions.

The first and second metal oxidic particles can be prepared in various different ways described in the prior art. In view of the high catalytic activity of the obtained catalyst and the high yield it is preferred that the first and/or second oxidic bulk particles are both separately prepared in a process comprising making a reaction mixture comprising one or more first compounds comprising one or more Group VIII metals, preferably Ni or Co, and one or more second compounds comprising one or more Group VIB metals, preferably molybdenum or tungsten in the presence of a protic liquid, reacting the first an second compounds wherein the first and second metal compounds remain at least partly in the solid state during the entire reaction.

Although a heat treatment or calcination is preferred it is not essential. It is essential that the temperature during heat treatment of the bulk catalyst composition, in particular the metal oxidic particles in the bulk catalyst composition, is below a temperature where transition to an inactive structure occurs. This applies to any and all heat treatment steps in the production process of the bulk catalyst. The skilled man can determine the maximum heat treatment temperature for a given catalyst composition. This applies in particular also to heat treatment of shaped bulk catalyst particles after compositing and shaping. Preferably, the bulk catalyst is heat treated below 450° C., more preferably below 400° C., even more preferably below 375° C. and most preferably below 350° C.

The process may further comprise one or more of the following process steps:
  i) compositing of the metal oxidic particles with 0 to 40 wt % of one or more materials selected from the group of binder materials, conventional hydroprocessing catalysts, acidic promoters, or mixtures thereof before, during or after the combining and/or reacting of the metal compounds,
  ii) spray-drying, (flash) drying, milling, kneading, slurry-mixing, dry or wet mixing, or combinations thereof
  iii) shaping,
  iv) drying and/or thermally treating, and
  v) sulphiding.

Details of the process steps for the preparation of the first and second metal oxidic particles are described in the prior art, in particular in WO 00/41810 or WO 00/41811, which are herewith incorporated by reference.

The bulk catalyst comprises at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. In view of obtaining high catalytic activity it is preferred that the bulk catalyst according to the invention comprises at least 70 wt %, more preferably at least 75 wt %, even more preferably at least 80 wt % and most preferably at least 85 wt % metal oxidic particles. The remaining 0 to 40 wt % can be one or more materials selected from the group of binder materials, conventional hydroprocessing catalysts, acidic promoters and cracking components.

Typically, the metal oxidic particles are composited with a binder and then shaped, preferably extruded, to form shaped bulk catalyst particles. In shaped bulk catalyst it is preferred to composite the metal oxidic particles with binder material to improve the side crushing strength of the shaped particles. Suitable shaping processes are extruding, pilling, pelletising, but also spray drying (optionally in the presence of a binder) and grinding or agglomerating optionally in combination with sieving to a specified narrow particle size distribution.

The invention also relates to a shaped bulk catalyst comprising metal oxidic particles comprising one or more Group VIII metals and two or more Group VIB metals which is obtainable by the process according to the invention. The invention also relates to a shaped bulk catalyst as described above that has been sulphided, to the use of the shaped bulk catalyst or sulphided bulk catalyst in hydroprocessing of a hydrocarbon feedstock comprising sulphur and nitrogen containing organic compounds and to a process for the hydroprocessing a hydrocarbon feedstock comprising contacting the feedstock with hydrogen in the presence of a catalytically effective amount of the shaped bulk catalyst or sulphided bulk catalyst of the invention under catalytic conversion conditions.

It was found that said catalyst rich in tungsten is particularly active in hydrodesulphurisation. The invention further relates to the shaped bulk catalyst or sulphided bulk catalyst according to the invention, wherein said catalyst comprises at least 50, preferably more than 60, 65 or even 70% (mole % relative to the total of Group VIB metals) of tungsten and its use as hydrodesulphurisation catalyst in the hydroprocessing of a hydrocarbon feedstock. It was further found that the activity is significantly higher at high pressure. Therefore the pressure preferably is more than 20, preferably more than 40, and even more preferably more than 50 bar. Alternatively, the invention relates to the shaped bulk catalyst or sulphided bulk catalyst wherein said catalyst comprises at least 50, preferably more than 60, 65 or even 70% molybdenum (mole % relative to the total of Group VIB metals) and to its use as a hydrodenitrogenation catalyst in hydroprocessing of a hydrocarbon feedstock. It was found that said catalyst is more active in hydrodenitrogenation compared to the corresponding trimetallic catalyst with lower Mo content.

The invention will be further illustrated by the Examples and comparative experiments described below. The catalysts were tested using the diesel test procedure D1 described below using two different temperature and pressure test conditions 1 and 2 described in Table 2 and gasoil feedstock as described in Table 1. The postfix 1 or 2 (as for example in RWA1 and RWA2) refer to the test condition 1 and 2 respectively. The RWA/RVA values of the reference catalyst C1 in diesel test procedure D1 were defined as 100. All other RWA/RVA values are calculated relative to this reference catalyst.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were presulphided via liquid phase presulphiding using the feed described in Table 1, which had been spiked with dimethyidisulfide to a total sulfur content of 3.7 wt. %. The presulphided catalysts were then tested in the hydrotreating of a diesel feedstock having the properties shown in Table 1:

TABLE 1

| | GAS OIL FEEDSTOCK |
|---|---|
| Sulphur content (% wt) | 1.24 |
| Nitrogen content (ppm wt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Intial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |

TABLE 1-continued

| | GAS OIL FEEDSTOCK |
|---|---|
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

| | Presulphiding | Condition 1 | Condition 2 |
|---|---|---|---|
| Temperature (° C.) | 315 | 320 | 340 |
| Pressure (bar) | 30 | 40 | 20 |
| H2 to oil ratio (Nl/l) | 200 | 300 | 300 |
| LHSV(1/h) | 3.0 | 2.0 | 1.5 |

The test results are given in Table 3 wherein RWA is relative weight activity, based on the total catalyst amount loaded in the reactor. HDN is hydrodenitrogenation and HDS is hydrodesulphurisation. CBD means compacted bulk density of the catalyst. R3 indicates the solid-solid reaction process wherein both the first and second metal compounds are at least partly solid during the reaction.

Comparative Experiment 1 (C1: Ni1.5Mo0.5W0.5 R3)

115.2 g of MoO3 (0.8 mole Mo, ex. Aldrich) and 200 g of tungstic acid H2WO4 (0.8 mole W, ex. Aldrich) were slurried in 6400 ml of water suspension A) and heated to 90° C. 282.4 g of nickel hydroxycarbonate 2NiCO3*3Ni(OH)2*4 H2O (2.4 mole of Ni, ex. Aldrich) were suspended in 1600 ml of water and heated to 90° C. (suspension B). The nickel hydroxycarbonate used in this and the other examples had a B. E. T. surface area of 239 m$^2$/g. Suspension B was added to suspension A in 10 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulphided and tested using the procedure from Diesel test procedure 1 and the conversion results are summarised in Table 3.

Comparative Experiment 2 (C2: Ni1.5W0.5Mo0.5 Made from Unreacted Oxides)

A catalyst was prepared by wet mixing of unreacted oxides of Group VIB and Group VIII metal components: a catalyst was prepared using 185.6 g of WO$_3$ (0.8 mole W, ex. Aldrich), 115.2 g of MoO$_3$ (0.8 mole Mo, ex. Aldrich) and 180 g of NiO (2.4 mole Ni, ex. Aldrich). The wet oxide mix was mixed with 2.5 wt. % of a binder based on the total weight of the catalyst composition. The metal oxidic particles were extruded, dried, calcined and sulphided and subsequently tested as described in C1. The conversion results are summarised in Table 3. The poor activity results show that is essential to react the Group VIB and Group VIII oxidic metal compounds before combining.

EXAMPLE 1

(E1: Ni1.5Mo0.25W0.75 Mixed Wet Cakes R3 Catalyst)

A Ni-W wet filter cake was prepared as described in C1, except that only one Group VIB metal component tungsten was used: a catalyst was prepared using 400 g of tungstic acid (1.6 mole W, ex. Aldrich) and 282.4 g of nickel hydroxycarbonate (2.4 mole Ni). The yield was about 99%.

Further, a Ni-Mo wet filter cake was prepared as described in C1, except that only one Group VIB metal component molybdenum was applied: a catalyst was prepared using 230.4 g of molybdenum trioxide (1.6 mole Mo, ex. Aldrich) and 282.4 g of nickel hydroxycarbonate (2.4 mole Ni). The yield was about 85%.

The wet Ni-W filter cake prepared as described above was mixed with wet Ni-Mo filter cake as described above. The amount the respective cakes was adjusted as to obtain the Ni to Mo to W mole ratio of 1.5 to 0.25 to 0.75. (512 g (dry base) of Ni-W cake+128 g Ni-Mo cake (dry base)). The metal oxidic particles mixture was extruded, dried, calcined and sulphided and subsequently tested as described in C1. The conversion results are summarised in Table 3. Surprisingly the HDS activity, in particular in the first test condition is significantly better than the trimetallic reference catalyst C1.

EXAMPLE 2

(E2: Ni1.5Mo0.5W0.5 Mixed Wet Cakes R3 Catalyst)

The catalyst was prepared as in E1 except that the amount of the respective cakes was adjusted as to obtain the Ni to Mo to W mole ratio of 1.5 to 0.5 to 0.5 (341.6 g (dry base) of Ni-W cake+256 g Ni-Mo cake (dry base)). The metal oxidic particles mixture was extruded, dried, calcined and sulphided and subsequently tested as described in C1. The conversion results are summarised in Table 3.

EXAMPLE 3

(E3: Ni1.5Mo0.75W0.25 Mixed Wet Cakes R3 Catalyst)

The catalyst was prepared as in E1 except that the amount of the respective cakes was adjusted as to obtain the Ni to Mo to W mole ratio of 1.5 to 0.75 to 0.25. [170.4 g (dry base) of Ni-W cake+384.8 g Ni-Mo cake (dry base)] The metal oxidic particles mixture was extruded, dried, calcined and sulphided and subsequently tested as described in C1. The conversion results are summarised in Table 3.

EXAMPLE 3

(E3: Ni1.5Mo0.5W0.5 Mixed Wet Cakes R3 Catalyst)

Ni-W filter cake prepared as described in C3 and subsequently dried at 120° C. for 16 hours was mixed with Ni-Mo filter cake prepared as described in C4 and subsequently dried at 120° C. for 16 hours. The amount the respective cakes was adjusted as to obtain the Ni to Mo to W mole ratio of 1.5 to 0.5 to 0.5. [341.6 g (dry base) of Ni-W cake+256 g Ni-Mo cake (dry base)] The metal oxidic particles mixture was extruded, dried, calcined and sulphided and subsequently tested as described in C1. The conversion results are summarised in Table 3.

Examples E1 to E3 show that a progressively higher HDS1 activity is obtained at increasing it W to Mo ratio; whereas on the other hand a progressively higher HDN1 activity is obtained at decreasing W to Mo ratio. A catalyst having more than 50% Mo (more % relative to total of W and Mo) is preferably used as a HDN catalyst; whereas a catalyst having more than 50% W is preferably used a HDS catalyst. Both said catalyst can easily be prepared using the same Ni-W and Ni-Mo trimetallic metal oxidic particles by mixing the first and second oxidic particles in the relative amounts required for achieving the overall composition of the shaped bulk catalyst desired for the envisaged end use.

TABLE 3

Results of activity tests

| Sample | composition | test process | extrudates | RWA HDS1 | RWA HDS2 | RWA HDN1 | RWA HDN2 |
|---|---|---|---|---|---|---|---|
| C1 | Ni 1.5 Mo 0.5 W 0.5 | R3 | D1 | 100 | 100 | 100 | 100 |
| C2 | Ni 1.5 Mo 0.5 W 0.5-made from unreacted oxides | comix | D1 | 14 | 27 | 33 | 30 |
| E1 | Ni 1.5 Mo 0.25 W 0.75 mixed wet cakes | R3 | D1 | 121 | 86 | 119 | 90 |
| E2 | Ni 1.5 Mo 0.5 W 0.5 mixed wet cakes | R3 | D1 | 118 | 89 | 127 | 100 |
| E3 | Ni 1.5 Mo 0.75 W 0.25 mixed wet cakes | R3 | D1 | 86 | 86 | 151 | 102 |
| E4 | Ni 1.5 Mo 0.5 W 0.5 mixed dried cakes | R3 | D1 | 115 | 87 | 132 | 96 |

The invention claimed is:

1. A process for the preparation of a shaped bulk catalyst comprising metal oxidic particles having one or more Group VIII metals and two or more Group VIB metals, which process comprises the steps of:
   i) providing first metal oxidic particles having one or more first Group VIII metals and one or more first Group VIB metals;
   ii) providing separately prepared second metal oxidic particles having one or more second Group VIII metals and one or more second Group VIB metals, wherein the composition of Group VIB and Group VIII metals in the first and second metal oxidic particles are different;
   iii) combining the first and second metal oxidic particles to form a bulk catalyst composition before and/or during shaping; and iv) shaping the combined first and second metal oxide particles to form the shaped bulk catalyst.

2. The process according to claim 1, wherein the one or more first Group VIB metals and/or Group VIII metals in the first metal oxidic particles are different from the one or more second Group VIB metals and/or Group VIII metals in the second metal oxidic particles.

3. The process according to claim 2, wherein the first metal oxidic particles comprise molybdenum and the second metal oxidic particles comprise tungsten.

4. The process according to claim 3, wherein the first and second oxidic bulk particles are combined in such relative amounts that the molybdenum to tungsten mole ratio in the shaped bulk catalyst composition is between 1:9 and 9:1.

5. The process according to claim 1, wherein the one or more Group VIII metals in the first metal oxidic particles are the same as the one or more Group VIII metals in the second metal oxidic particles.

6. The process according to claim 5, wherein the one or more Group VIII metals in both the first and second metal oxidic particles are the same, and the Group VIB metal in the first oxidic bulk catalyst is substantially molybdenum and the Group VIB metal in the second oxidic bulk catalyst is substantially tungsten.

7. The process according to claim 6, wherein the first metal oxidic particles comprise nickel and molybdenum, and the second metal oxidic particles comprise nickel and tungsten.

8. The process according to claim 6, wherein the one or more Group VIII metals in the first and second metal oxidic particles is nickel or cobalt.

9. The process according to claim 1, wherein the first metal oxidic particles comprise 2 or more group VIB metals and one or more Group VIII metals, and wherein the second oxidic particles comprise essentially only one Group VIB metal and one or more Group VIII metals.

10. The process according to claim 9, wherein the first metal oxidic particles comprise nickel, molybdenum and tungsten particles, and the second metal oxidic particles comprise nickel and tungsten and/or nickel and molybdenum oxidic particles.

11. The process according to claim 1, wherein the first and second oxidic bulk particles are both freshly prepared.

12. The process according to claim 1, wherein the one of the first or second oxidic bulk particles are provided in the form of regenerated spent or reject metal oxidic particles or bulk catalyst and the other of the first or second oxidic bulk particles is freshly prepared.

13. The process according to claim 1, wherein the first and/or second oxidic bulk particles are prepared in a process comprising:
   i) preparing a reaction mixture comprising one or more first compounds comprising one or more Group VIII metals, and one of more second compounds comprising one or more Group VIB metals, in the presence of a protic liquid, and
   ii) reacting the first and second compounds wherein the first and/or second metal compounds remain at least partly in the solid state during the entire reaction.

14. The process according to claim 13, wherein both the first and second metal compounds are free from nitrogen atoms, and further comprising the step of recycling the protic liquid separated from the reacted metal oxidic particles.

15. The process according to claim 1, further comprising calcining the shaped oxidic bulk catalyst at a temperature below 400° C.

16. The process for the manufacture of a bulk catalyst according to claim 1, further comprising one or more of the following process steps:
   i) compositing of the metal oxidic particles with 0 to 40 wt% of one or more materials selected from the group of binder materials, conventional hydroprocessing catalysts, racking compounds, acidic promoters or mixtures thereof before, during or after the combining and/or reacting of the metal compounds;
   ii) spray-drying, (flash) drying, milling, kneading, slurry-mixing, dry or wet mixing, or combinations thereof;
   iii) additional shaping steps;
   iv) drying and/or thermally treating, and
   v) sulphiding.

17. A process for hydroprocessing of a hydrocarbon feedstock comprising sulfur and nitrogen containing organic compounds comprising the steps of preparing a shaped, bulk catalyst by:
   i) providing first metal oxidic particles having one or more first Group VIII metals and one or more first Group VIB metals;
   ii) providing separately prepared second metal oxidic particles having one or more second Group VIII metals and one or more second Group VIB metals, wherein the composition of Group VIB and Group VIII metals in the first and second metal oxidic particles are different;
   iii) combining the first and second metal oxidic particles to form a bulk catalyst composition before and/or during shaping; and
   iv) shaping the combined first and second metal oxide particles to form the shaped bulk catalyst; and contacting the hydrocarbon feedstock with the shaped bulk catalyst.

18. The process of claim 17 wherein the shaped bulk catalyst comprises at least 50 mole % of tungsten relative to the total of Group VIB metals.

19. The process of claim 17 wherein said the shaped bulk catalyst comprises at least 50 mole % molybdenum relative to the total of Group VIB metals.

* * * * *